(12) United States Patent
Kurihara et al.

(10) Patent No.: US 7,534,484 B2
(45) Date of Patent: May 19, 2009

(54) THERMOSETTING RESIN COMPOSITE MATERIAL AND METHOD FOR PRODUCING THE SAME

(75) Inventors: Sho Kurihara, Tokyo (JP); Hiroshi Idei, Tokyo (JP); Mamoru Amano, Tokyo (JP); Yoshihiro Aoyagi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 214 days.

(21) Appl. No.: 11/665,216

(22) PCT Filed: Jan. 20, 2006

(86) PCT No.: PCT/JP2006/300842

§ 371 (c)(1), (2), (4) Date: Apr. 12, 2007

(87) PCT Pub. No.: WO2006/077962

PCT Pub. Date: Jul. 27, 2006

(65) Prior Publication Data

US 2007/0261598 A1 Nov. 15, 2007

(30) Foreign Application Priority Data

Jan. 20, 2005 (JP) .............................. 2005-012852

(51) Int. Cl.
*B32B 13/02* (2006.01)

(52) U.S. Cl. .............. 428/294.7; 423/447.4; 423/447.6; 423/447.7; 264/29.2

(58) Field of Classification Search .............. 428/294.7; 423/447.4, 447.6, 447.7; 106/169.57; 264/29.2
See application file for complete search history.

(56) References Cited

U.S. PATENT DOCUMENTS

| | | | | |
|---|---|---|---|---|
| 3,926,907 | A | * 12/1975 | Engle, III | .................... 524/140 |
| 4,024,227 | A | * 5/1977 | Kishimoto et al. | ....... 423/447.4 |
| 2007/0261598 | A1 * | 11/2007 | Kurihara et al. | ........ 106/169.57 |
| 2008/0319124 | A1 * | 12/2008 | Kurihara et al. | ............. 524/540 |

FOREIGN PATENT DOCUMENTS

| | | |
|---|---|---|
| JP | 10-330534 | 12/1998 |
| JP | 2001-26724 | 1/2001 |
| JP | 2002-69309 | 3/2002 |
| JP | 2003-268245 | 9/2003 |
| JP | 2003-327851 | 11/2003 |
| JP | 2003-533575 | 11/2003 |
| JP | 2005-89522 | 4/2005 |
| JP | 2005-272554 | 10/2005 |

OTHER PUBLICATIONS

PCT Second and Supplementary Notice Informing The Applicant Of The Communication Of The International Application; WO 2006/077962; PCT/JP2006/300842/ date of mailing May 24, 2007.
PCT International Preliminary Report on Patentability; International application No. PCT/JP2006/300842; Jul. 24, 2007 Date of issuance of this report; Translation PCT Written Opinion of the International Searching Authority.

* cited by examiner

*Primary Examiner*—N. Edwards
(74) *Attorney, Agent, or Firm*—Finnegan, Henderson, Farabow, Garrett & Dunner, L.L.P.

(57) ABSTRACT

The present invention provides a thermosetting resin composite material excellent in mechanical strength and wear resistance at high temperature, which is achieved by converting graphite into thin-layered one and dispersing it in a thermosetting resin homogeneously.

A thermosetting resin composite material, wherein an organically modified graphite having an organic compound molecule inserted between graphite layers is mixed with a thermosetting resin, the organically modified graphite being prepared by subjecting graphite to a chemical treatment to form a graphite interlayer compound having a low-molecular substance inserted between graphite layers and subsequently immersing the resultant product in a solution of an organically modifying agent, as well as a process for producing the same. Preferably, the organically modified graphite is mixed with a thermosetting resin to be converted into thin-layered one having a layer thickness of 0.1 to 100 nm, a layer length of 100 nm to 100 μm, and an aspect ratio of 100 to 1,000,000.

4 Claims, No Drawings

THERMOSETTING RESIN COMPOSITE MATERIAL AND METHOD FOR PRODUCING THE SAME

CROSS-REFERENCE TO RELATED APPLICATIONS

This application is a national phase application of International Application No. PCT/JP2006/300842, filed Jan. 20, 2006, and claims the priority of Japanese Application No. 2005-012852, filed Jan. 20, 2005, the content of both of which is incorporated herein by reference.

TECHNICAL FIELD

The present invention relates to a thermosetting resin composite material excellent in mechanical strength and wear resistance at high temperature and capable of being applied to friction materials, molding compounds, machinery components, structural members, structural adhesives, and the like. More specifically, it relates to a thermosetting resin composite material wherein an organically modified graphite filler having organic compound molecules inserted between graphite layers is converted into thin-layered one and is homogeneously dispersed.

BACKGROUND ART

Conventionally, a layered clay mineral having a large aspect ratio (size/thickness of a particle) has been converted into thin-layered one and is homogeneously dispersed in a resin to improve resin properties such as mechanical strength, heat resistance, and gas barrier properties. Moreover, the effect of improving the above properties is more advantageous as the aspect ratio increases (e.g., see Patent Document 1). There is disclosed a composite material containing a layered silicate salt and a plasticiser, wherein the layered silicate salt is finely dispersed. Therein, a means of finely dispersing a layered silicate salt such as a smectite-based clay mineral by organically treating interlayers of the layered silicate salt with a cationic surfactant (a quaternary ammonium salt or the like) is shown (see Patent Document 2). Furthermore, as a composite material wherein a carbonaceous material is dispersed in an order of nanometer size, there is disclosed a composite resin composition composed of a resin and a layered carbon dispersed in the resin, wherein the layered carbon is modified or subjected to a solubilization treatment (see Patent Document 3).

Patent Document 1: JP-A-10-330534
Patent Document 2: JP-A-2001-26724
Patent Document 3: JP-A-2003-268245

DISCLOSURE OF THE INVENTION

Problems that the Invention is to Solve

In the above composite resin material wherein a layered clay mineral is converted into thin-layered one and is homogeneously dispersed in a resin, it is described that improvement in mechanical properties, e.g., improvement of strength, elasticity, and thermal deformation temperature and improvement of flame retardancy and gas barrier properties are attained. In the case of the composite material containing a layered silicate salt and a plasticizer wherein the layered silicate salt is finely dispersed, it is described that physical properties of the matrix are remarkably improved. However, the improvement in mechanical properties is not so large in both cases. Also, in the case of the composite resin composition composed of a resin and a layered carbon dispersed in the resin, wherein the layered carbon is modified or subjected to a solubilization treatment, the layered carbon is to be modified or subjected to a solubilization treatment and hence a hardly graphitizable precursor, an easily graphitizable carbon precursor, a carbide, or the like is used as a carbonaceous material, so that physical properties, mechanical properties, and thermal properties are not so improved.

In the case of the composite resin composition of the above Patent Document 3 wherein the layered carbon modified or subjected to a solubilization treatment is dispersed in the resin, there is an explanation as if graphite could be used as the layered carbon. However, conversion into thin-layered one is not sufficient as described that graphite is usually used as a powder or granules and furthermore any means for the conversion has not been developed.

Thus, if graphite known to be a substance structurally having a strong layer structure is converted by a certain treatment into one having a structure wherein layers are separated one another between the layers, there is to be obtained graphite as a layered substance having a larger aspect ratio and exhibiting a large improving effect of the properties. Usually, the aspect ratio of the layered clay mineral is about 500 at the maximum but it is possible for graphite to have larger aspect ratio by converting the graphite into thin-layered one, so that a larger improvement of properties can be expected.

However, in the laminated structure of a graphite layer, van der Waals force of a six-membered ring structure is dominant and surface properties are inactive, so that conversion into thin-layered one is very difficult. In addition, since graphite having a larger aspect ratio is more difficultly converted into thin-layered one, thin-layered one is not in practical use.

The present invention is conducted in consideration of such conventional problems and an object thereof is to provide a thermosetting composite material excellent in mechanical strength and wear resistance at high temperature by converting graphite into a thin-layered one and dispersing it in a thermosetting resin homogeneously.

Means for Solving the Problems

As a result of the extensive studies for solving the above problems, the present inventors have found that when graphite is subjected to a chemical treatment to form a graphite interlayer compound having a low-molecular substance inserted between graphite layers, then the resultant product was immersed in a solution of an organically modifying agent to form an organically modified graphite, and the organically modified graphite is mixed with a thermosetting resin, the graphite is converted into a thin-layered one and is homogeneously dispersed in the thermosetting resin, resulting in improvement in mechanical strength and wear resistance at high temperature of the resulting thermosetting resin composite material. Based on the findings, we have accomplished the invention.

Namely, the invention is constituted by the followings.

(1) A thermosetting resin composite material of a mixture of an organically modified graphite with a thermosetting rein, wherein the organically modified graphite is prepared by subjecting graphite to a chemical treatment to form a graphite interlayer compound having a low-molecular substance inserted between graphite layers, and subsequently immersing the resultant product in a solution of an organically modifying agent to insert an organic compound molecule between the graphite layers.

(2) The thermosetting resin composite material according to the above (1), wherein the organically modified graphite is mixed with the thermosetting resin and is converted into thin-layered one having a layer thickness of 0.1 to 100 nm, a layer length of 100 nm to 100 µm, and an aspect ratio of 100 to 1,000,000.

(3) A method for producing a thermosetting resin composite material, which comprises subjecting graphite to a chemical treatment to prepare a graphite interlayer compound having a low-molecular substance inserted between graphite layers, immersing the resultant product in a solution of an organically modifying agent to prepare an organically modified graphite having an organic compound molecule inserted between graphite layers, and mixing the organically modified graphite with a precursor of a thermosetting resin to effect a polymerization reaction.

(4) The method for producing a thermosetting resin composite material according to the above (3), wherein an uncured thermosetting resin is thermally melted or dissolved with a solvent and an organically modified graphite is added thereto, followed by kneading by means of a kneading machine such as a kneader or a roll, the organically modified graphite being prepared by subjecting graphite to a chemical treatment to form a graphite interlayer compound having a low-molecular substance inserted between graphite layers and subsequently immersing the resultant product in a solution of an organically modifying agent.

Advantage of the Invention

According to the invention, a thermosetting resin composite material wherein graphite is converted into thin-layered one and is homogeneously dispersed. Moreover, since the graphite having an aspect ratio larger than that of former ones is added, mechanical strength of the thermosetting resin composite material is improved and further, because of an effect of inhibiting oxidative degradation owing to high heat resistance of graphite, it becomes possible to improve wear resistance at high temperature, so that the invention contributes to improvement in high-temperature lifetime of machine components and structural materials.

An organically modified graphite can be prepared by subjecting graphite to a chemical treatment to form a graphite interlayer compound having a low-molecular substance inserted between graphite layers and then immersing the resultant product in a solution of an organically modifying agent. The organically modified graphite can be homogeneously mixed at the time when it is mixed with a thermosetting resin.

BEST MODE FOR CARRYING OUT THE INVENTION

The following will describe the constitution of the invention in more detail.

As the thermosetting resin in the composite material of the invention, there may be mentioned phenol resins (including various phenol resins modified with cashew, rubber, silicone, phenol aralkyl, phosphorus, boron, polyvinylbutyral, acryl, epoxy, melamine, oil, and the like), melamine resins, urea resins, polyimide resins, epoxy resins, polybenzoxazine resins, and the like. These resin are used solely or as a mixture or two or more thereof.

Moreover, graphite to be used as a starting material for thin-layered graphite is preferably highly crystalline graphite having a widely extended graphite layer surface. For example, natural phosphorus graphite, highly oriented thermally decomposed graphite, and the like are preferred.

The composite material of the invention comprises the above thermosetting resin and graphite homogeneously dispersed in the resin in a thin-layered state. Herein, with regard to the thin-layered range of the graphite dispersed in the thermosetting resin, a layer thickness is 0.1 nm to 100 nm and an aspect ratio is 100 to 1,000,000. The average particle diameter (in the plane direction) of the graphite is preferably in the range of 100 nm to 100 µm.

As the mixing amount of the graphite to the thermosetting resin is desirably from 0.1 to 20 wt %. When the amount is smaller than the range, the effect of the addition is hardly exhibited. To the contrary, when the amount is larger than the range, it becomes difficult to disperse the graphite in the resin.

The following will describe the method for producing the thermosetting resin of the invention. The method comprises a step of subjecting graphite to a chemical treatment to prepare a graphite interlayer compound having a low-molecular substance inserted between graphite layers, a step of immersing the resultant graphite interlayer compound in a solution of an organically modifying agent to prepare an organically modified graphite having an organic compound molecule inserted between graphite layers, and a step of mixing the resultant organically modified graphite with a precursor of a thermosetting resin to effect a polymerization reaction.

First, a step of preparing the graphite interlayer compound by a chemical treatment of graphite with a low-molecular substance, e.g., an acid is described.

The following method is mentioned as the process for preparing the above graphite interlayer compound.

(a) Immersing Method, Solvent Method

A method of immersing graphite in a solution containing a low-molecular substance to be inserted between graphite layers.

(b) Vapor Reaction Method

A method of bringing graphite into contact with a vapor containing a vapor of a low-molecular substance to be inserted between graphite layers.

(c) Electrochemical Method

A method of subjecting a graphite electrode to a reaction under the flow of an electric current in a solution containing a low-molecular substance to be inserted between graphite layers.

(d) Pressurizing Method

A method of mixing graphite with a powder of a low-molecular substance to be inserted between graphite layers and pressurizing the resultant mixture to effect a reaction.

In this connection, the following may be mentioned as the low-molecular substance to be inserted between graphite layers:

acids, halogens and halides, metal oxides, alkaline and alkaline earth metals, transition metals and transition metal compounds, mixtures of the above compounds and solvents.

The following will describe a process for preparing the organically modified graphite.

As a means for inserting an organic compound between graphite layers, a method of immersion in a solution of an organically modifying agent is used.

As an organically modifying agent to be preferably used in the invention, the following may be mentioned:

alkylamines and salts thereof: dodecylamine, octadecylamine, and the like;

alkylammoniums and salts thereof: dodecyltrimethylammonium salts and the like;

alkyldiamines: 1,12-dodecandiamine and the like;

alkylaminocarboxylic acids: 12-aminododecanoic acid and the like.

For the purpose of improving mechanical strength, it is effective to subject graphite to an acid treatment and thereby introduce a polar functional group into a graphite terminal to improve bonding force between the thermosetting resin and the graphite. In addition, it is effective to use a treatment with any of various coupling agents or surfactants or a surface modifying technology by a plasma/corona treatment in combination.

Then, the following will describe a step of polymerizing the organically modified graphite and the thermosetting resin. As mixing methods of the organically modified graphite into the thermosetting resin, the following methods can be used.

(a) A method of mixing the organically modified graphite with a precursor of the thermo setting resin and concurrently effecting a polymerization reaction of the resin to disperse graphite together with the polymerization of the resin.

(b) A method of hot-melting an initial condensate or a precursor of the thermosetting resin or dissolving it with a solvent and kneading the resultant one with adding the organically modified graphite by means of a kneader or a roller.

Then, a curing reaction of the initial condensate in the mixture obtained in the above mixing step is carried out to obtain a composite material.

The reaction may be carried out using the above mixture as it is or may be carried out after the mixture is dispersed in a polar solvent.

As the polar solvent, there may be mentioned water, ether, carbon disulfide, carbon tetrachloride, glycerin, glycol, toluene, aniline, benzene, chloroform, N,N'-dimethylformamide, phenol, tetrahydrofuran, acetone, propylene carbonate, acetic acid, methanol, ethanol, propanol, methyl ethyl ketone, pyridine, benzonitrile, acetonitrile, dimethyl sulfoxide, nitrobenzene, nitromethane, and the like. They are used solely or as a mixture of two or more thereof.

The above polymerization is carried out by adding a polymerization initiator or applying heat or light to the above mixture. Moreover, with regard to the kind of the polymerization, any polymerization method may be applicable and an initiator suitable for each polymerization mode may be employed.

The above mixing material may be utilized after formed by injection molding or thermal pressing or may be mixed beforehand with the other polymer to achieve a predetermined mixing ratio. Moreover, the above polymerization reaction may be effected in a predetermined mold to obtain a molded one.

EXAMPLES

The following will specifically describe the invention with reference to Examples but the invention is not limited by these Examples.

Example 1

Production of Thermosetting Resin Composite Material

Fifty grams of phosphorus graphite having an average particle diameter of 20 μm was immersed in a mixed acid of conc. sulfuric acid (800 g) and conc. nitric acid (50 g) all day and night and then the resultant solution was filtrated to obtain a residue A.

After the residue A was charged into 10 L of 1 wt % aqueous dodecylamine solution, the whole was stirred for 30 minutes and then the solution was filtrated to obtain 200 g of an organically modified graphite having dodecylamine molecules inserted between graphite layers.

Into a four-necked flask having a volume of 1000 ml were charged 200 g of the organically modified graphite (equivalent to 50 g of phosphorus graphite), 500 g of phenol, 324 g of formaldehyde, 1.8 g of oxalic acid dihydrate [$(COOH)_2 \cdot H_2O$], and 0.2 ml of a deforming agent (metal soap), followed by a polymerization reaction for 8 hours with stirring under reflux (100° C.). After the polymerization reaction, water and unreacted matter were removed by distillation under reduced pressure and the resultant viscous liquid was transferred into a tray and allowed to cool naturally to obtain a thermosetting resin composite material.

Comparative Example 1

Production of Thermosetting Resin by Conventional Method

Into a four-necked flask having a volume of 1000 ml were charged 500 g of phenol, 324 g of formaldehyde, 1.8 g of oxalic acid dihydrate, and 0.2 ml of a deforming agent, followed by a polymerization reaction for 8 hours with stirring under reflux (100° C.)

After the polymerization reaction, water and unreacted matter were removed by distillation under reduced pressure and the resultant viscous liquid was transferred into a tray and allowed to cool naturally to obtain a thermosetting resin material.

Comparative Example 2

Production of Graphite-Blended Thermosetting Resin

Into a four-necked flask having a volume of 1000 ml were charged 50 g of phosphorus graphite, 500 g of phenol, 324 g of formaldehyde, 1.8 g of oxalic acid dihydrate, and 0.2 ml of a deforming agent, followed by a polymerization reaction for 8 hours with stirring under reflux (100° C.).

After the polymerization reaction, water and unreacted matter were removed by distillation under reduced pressure and the resultant viscous liquid was transferred into a tray and allowed to cool naturally to obtain a graphite-blended thermosetting resin material.

(Structural Evaluation of Thermosetting Resin Material)

The resin composite materials prepared in Example 1 and Comparative Examples 1 and 2 were pulverized and subjected to powder X-ray diffraction measurement, and peak intensities of a diffraction peak ($2\theta=26.5°$) derived from lamination of graphite layers were compared one another. The results are shown in Table 1. In the case of the composite material of Example 1, since the peak ($2\theta=26.5°$) was not observed, it was confirmed that the graphite was thoroughly in a thin-layered state.

TABLE 1

Table 1 Results of Powder X-ray Diffraction Measurement

| Sample | Peak intensity (cps) 2θ = 26.5° |
|---|---|
| Example 1 | Not confirmed |
| Comparative Example 1 | Not confirmed |
| Comparative Example 2 | 1000 |

(Evaluation of Wear Resistance of Thermosetting Resin Material)

(1) A powder obtained by mixing 5 g of a resin composite material pulverized into an average particle diameter of 30 µm and 11 g of calcium carbonate was charged into a mold for hot molding and was subjected to hot compression molding under a pressure of 2.5 t at 150° C. for 10 minutes to prepare a test piece having a size of 20×40 ×10 mm.

(2) The test piece was subjected to a friction test at different temperature under the following conditions using a friction tester.
Mating material: cast iron
Frictional temperature (temperature of mating material): 100° C., 200° C., 300° C.
Number of frictional engagement: 500 times
Initial speed: 15 m/sec
Deceleration: 2.94 m/s$^2$ From results of the friction test at different temperature, wear ratios (worn volume per unit kinetic energy) were calculated and compared. Results are shown in Table 2. It is revealed that the composite material of Example 1 shows small wear ratios at 200° C. and 300° C. and thus is excellent in wear resistance at high temperature.

TABLE 2

Table 2 Results of friction test at different temperature

| Sample | Rubbing temperature | | |
|---|---|---|---|
| | 100° C. | 200° C. | 300° C. |
| Example 1 | 10 | 2 | 8 |
| Comparative Example 1 | 13 | 5 | 20 |
| Comparative Example 2 | 10 | 4 | 20 |

(unit of wear ratio: × 10$^4$ mm$^3$/kgf · m)

INDUSTRIAL APPLICABILITY

In the thermosetting resin composite material of the present invention, since a thin-layered graphite having a large aspect ratio is homogeneously dispersed in a thermosetting resin, mechanical strength of the resulting composite material is improved and is also excellent in wear resistance at high temperature, so that the material is useful as friction materials, molding compounds, machinery components, structural members, and the like.

The invention claimed is:

1. A thermosetting resin composite material of a mixture of an organically modified graphite with a thermosetting rein, wherein the organically modified graphite is prepared by subjecting graphite to a chemical treatment to form a graphite interlayer compound having a low-molecular substance inserted between graphite layers, and subsequently immersing the resultant product in a solution of an organically modifying agent to insert an organic compound molecule between the graphite layers.

2. The thermosetting resin composite material according to claim 1, wherein the organically modified graphite is mixed with the thermosetting resin and is converted into thin-layered structure having a layer thickness of 0.1 to 100 nm, a layer length of 100 nm to 100 µm, and an aspect ratio of 100 to 1,000,000.

3. A method for producing a thermosetting resin composite material, comprising:
subjecting graphite to a chemical treatment to prepare a graphite interlayer compound having a low-molecular substance inserted between graphite layers;
immersing the resultant product in a solution of an organically modifying agent to prepare an organically modified graphite having an organic compound molecule inserted between the graphite layers; and
mixing the organically modified graphite with a precursor of a thermosetting resin to effect a polymerization reaction.

4. The method for producing a thermosetting resin composite material according to claim 3, wherein an uncured thermosetting resin is thermally melted or dissolved with a solvent and an organically modified graphite is added thereto, followed by kneading by means of a kneading machine such as a kneader or a roll, the organically modified graphite being prepared by subjecting graphite to a chemical treatment to form a graphite interlayer compound having a low-molecular substance inserted between graphite layers and subsequently immersing the resultant product in a solution of an organically modifying agent.

* * * * *